March 20, 1962  K. LITZ  3,025,590
METHOD AND DEVICE FOR ARRANGING ROLLER ELEMENTS IN
CAGES, RACES OR TEMPORARY HOLDING MEANS
FOR THE ASSEMBLY OF A BEARING
Filed June 9, 1958  5 Sheets-Sheet 1

United States Patent Office 3,025,590
Patented Mar. 20, 1962

3,025,590
METHOD AND DEVICE FOR ARRANGING ROLLER ELEMENTS IN CAGES, RACES OR TEMPORARY HOLDING MEANS FOR THE ASSEMBLY OF A BEARING
Karl Litz, Herzogenaurach, near Nurnberg, Germany, assignor to Industriewerk Schaeffler O.H.G., Herzogenaurach, near Nurnberg, Germany, a company of Germany
Filed June 9, 1958, Ser. No. 740,917
Claims priority, application Germany June 14, 1957
9 Claims. (Cl. 29—148.4)

This invention relates to a method and a device for arranging bearing rollers, needles or balls, herein referred to as roller elements, in cages, races or temporary holding means for the assembly of a bearing.

Many devices and methods are known for the insertion of roller elements in cage windows, races, for example race rings, or in temporary holding means without a cage. The production of such devices entails considerable outlay. Generally they are limited in their application to only a few types. In many cases the roller elements are also inserted singly by hand.

An object of the present invention is to provide a method and apparatus which are particularly simple and widely applicable for the rapid insertion of roller elements into cages, races or temporary holding means.

According to the present invention there is provided a method of arranging roller elements for the assembly of a bearing, said method comprising drawing by air suction the roller elements against apertures shaped and positioned to locate the roller elements in the required position, and maintaining the suction of air to hold the roller elements in said required position for engagement of the elements by a co-operating bearing part in the assembly of the bearing.

The invention also provides a device for arranging roller elements for the assembly of a bearing, said device comprising a suction member formed with suction apertures opening at the operative face of the suction member and so shaped and arranged that, upon air suction being applied and the suction member being inserted into a container of roller elements, the apertures will draw roller elements from the container and hold the roller elements against the apertures in the required position for engagement of the elements by a co-operating bearing part in the assembly of the bearing.

When inserting roller elements in a cage having windows adapted to provide support for the roller elements in one radial direction, the roller elements are preferably drawn by aspirated air into the windows of the cage, which is for example fixed over the apertures of the suction member, and are held until an inner race or an outer race is provided to support the roller elements in the other radial direction.

The method can also be used for inserting roller elements in a cage having windows adapted to provide no radial support for the roller elements. In this case, the roller elements, which are disposed for example haphazardly in a container, are sucked and held by aspirated air against the apertures provided in the suction member and are shaped to locate the roller elements in the required position, until an outer race and an inner race are provided to support the roller elements in both radial directions.

Instead of races, temporary holding devices can of course also be used, for example appropriately shaped tubes made of for example pasteboard. When inserting bearing needles into a race for a universal joint, the needles are sucked against slots in a tubular suction member having approximately the diameter of the journal of the bearing and are held in this position until a needle race is provided to support the roller elements in conjunction with an end ring, in both radial directions.

The method can further be applied to the insertion of roller elements in radial bearings or in axial bearings. In the latter case, it is expedient for the cage of an axial bearing to be placed at, or in the free end of the suction member.

Any desired fans can be used for aspirating air. It is also possible to connect a plurality of suction devices to one fan. Where appropriate, it is also possible for already existing suction fans, employed for example for room ventilation, to be used directly for the method.

For a better understanding of the invention and to show how the same may be carried into effect, reference will now be made to the accompanying drawings, in which.

Figure 1:
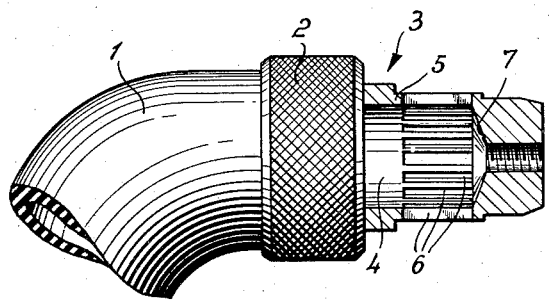
FIGURE 1 illustrates diagrammatically a first embodiment of the invention.

Referring now to FIGURE 1 of the drawing the device comprises a suction nozzle 3 to which is connected a hose 1 by means of an air-tight coupling 2. The nozzle 3 is of generally cylindrical shape and is formed with an axial bore defining a chamber 4 communicating with the hose 1. The wall 5 of the nozzle has formed therein equidistant and circumferentially arranged axial slots 6 so shaped that roller elements (not shown) can be brought to bear against the outside of the slots 6 without however passing therethrough. The end face 7 of the suction nozzle is closed.

During operation, air is aspirated through the slots 6, into the chamber 4 and along the hose 1 by means of a fan (not shown) connected to the hose 1 to produce suction at the slots. Thus, when the nozzle 3 is plunged into a container in which roller elements are haphazardly arranged, the aspirated air will suck a roller element against each slot and arrange the roller elements in parallel relationship to one another in accordance with the arrangement of the slots. Suction is maintained until the roller elements are supported between an inner race and an outer race.

Figure 2:
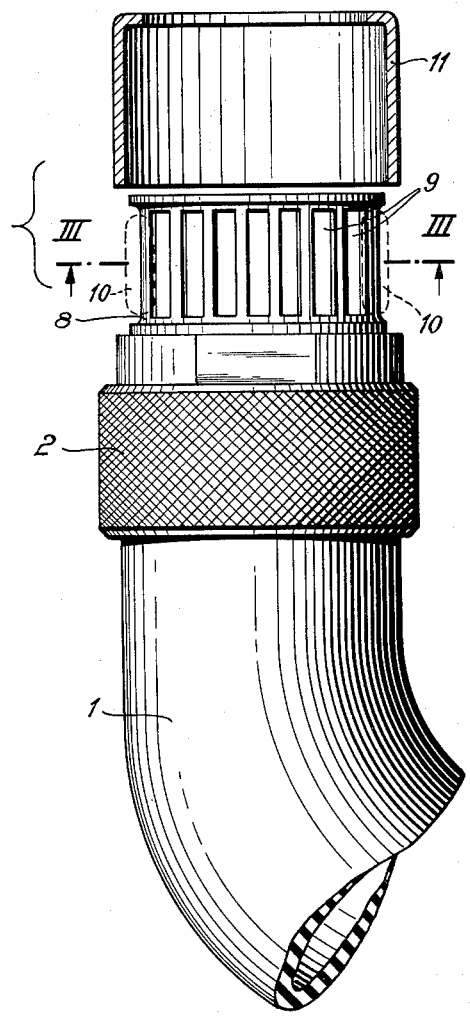
FIGURE 2 illustrates diagrammatically a second embodiment of the invention.
Figure 3:
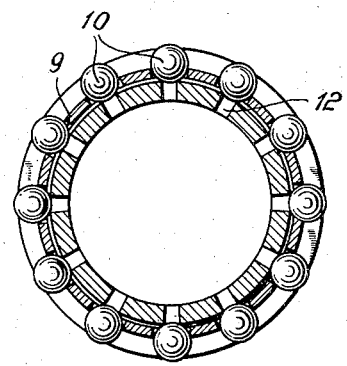
FIGURE 3 is a cross-section on the line III—III of FIGURE 2.

The device illustrated in FIGURES 2 and 3 of the drawings comprises a recessed nozzle coupled to a hose with which the nozzle recess communicates. The nozzle is formed with equidistant and circumferentially arranged axial slots 12. A cage 8 having windows 9 for bearing needles 10 is slipped over the nozzle, the windows 9 being arranged in register with the slots 12 of the nozzle. The windows 9 are narrower than the diameter of the needles 10 so that after assembly of the cage 8 and of a race 11 by pushing the latter over the cage and needles, and after removal of the assembled parts from the nozzle, the needles cannot fall out of position either radially inwardly or radially outwardly.

It will be noted that the slots 12 are also narrower than the diameter of the needles 10 so as to ensure that the latter cannot pass through the slots during operation and so that the slots can provide radially inward support for the needles when the width of the windows in the cage is such that the needles can pass through the windows. In such a case, however, removal of the assembled cage, needles and race can only be effected by pushing simultaneously into the cage, for example, a temporary pasteboard sleeve to prevent the needles from falling out of the cage windows since the needles are not in this case supported radially inwardly.

Insertion of the needles into the cage windows is effected by aspirating air through the windows 9 and the slots 12 into the hose and plunging the nozzle and associated cage into a container of needles whereby a needle is sucked into each window of the cage. The needles are then held in the windows by suction until the race 11 is slipped over the cage and needles.

Figure 4:
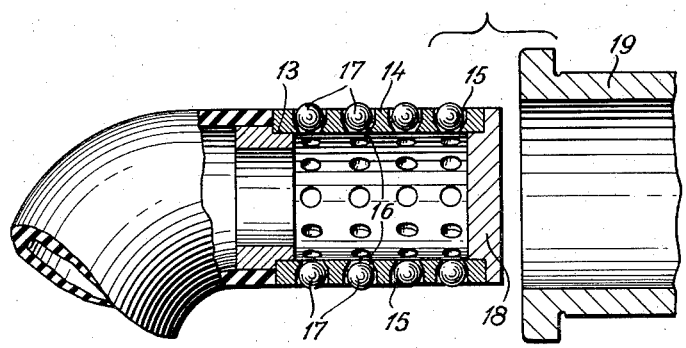
FIGURE 4 illustrates diagrammatically a third embodiment of the invention.

The device illustrated in FIGURE 4 comprises a centering attachment 13 fitted to the mouth of a hose. The centering attachment 13 is formed of a perforated plug having a reduced diameter portion protruding from the end of the hose and fitted into one end of a cage 14, the opposite end of the cage being closed by a stopper 18. The cage 14 is formed with four series of circumferential and equidistant apertures 15 which are pocket-shaped to prevent balls 17 accommodated in the pockets from passing into the space surrounded by the surface 16, the diameter of the apertures 15 at the surface 16 being smaller than the diameter of the balls 17. The nozzle of this device therefore effectively comprises in this embodiment the cage 14.

During operation, air is aspirated by a fan (not shown) through the apertures 15 into the space surrounded by the surface 16, through the centering attachment 13 and along the hose so that when the nozzle is plunged into a container of balls, one ball will be sucked into each aperture 15 and will be held there until a collared race sleeve 19 is fitted over the cage to provide radially external support for the balls 17. Suction by the fan is then ceased and the cage 14 is then detached from the centering attachment 13 and the stopper 18 is removed from the cage, whereupon another cage is fitted onto the centering attachment 13.

Figure 5:
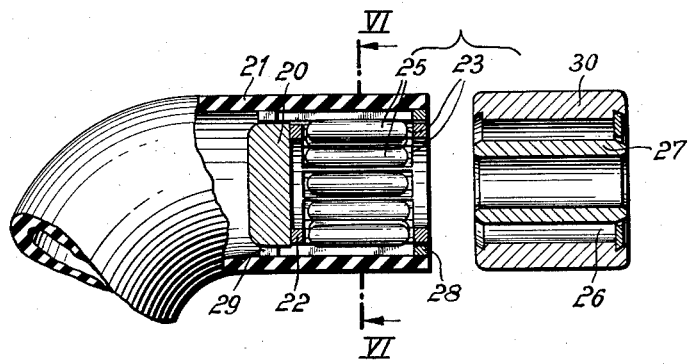
FIGURE 5 illustrates diagrammatically a fourth embodiment of the invention.
Figure 6:
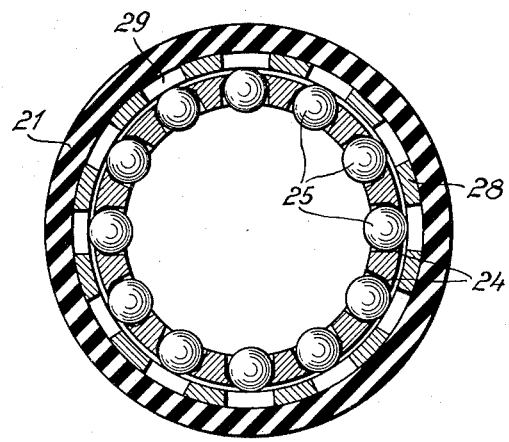
FIGURE 6 is a cross-section on the line VI—VI of FIGURE 5.

FIGURES 5 and 6 illustrate a device for sucking roller elements 25 into the windows 23 of a cage 22 from within the cage, the windows 23 being made narrower at the outer surface 24 of the cage to prevent the roller elements 25 from passing therethrough radially outwardly. The device comprises a nozzle which is push-fitted into the mouth of a hose 21. The nozzle consists essentially of a circular mounting 20 formed with peripheral crenellations having a thickness less than the mounting 20, and a cylindrical comb-like member consisting of an end ring from which circumferentially spaced elements 28 extend axially towards the crenellations of the mounting 20, the free end portions of the elements 28 surrounding and engaging the mounting 20 to bear against the radial projections around the mounting 20. The nozzle thus defines an open chamber in which a cage 22 is inserted and which provides passages 29 for air aspirated by a fan (not shown) into the hose 21, the end ring of the comb-like member preventing air being drawn into the hose except through the spaces between the elements 28. To ensure proper operation of the device, the windows 23 of the cage should be arranged to register with the spaces between the elements 28 so that air which is aspirated by the fan (not shown) will pass through the windows 23 and the passages 29 into the hose to suck roller elements 25 into the windows 23 from inside the cage. The inner race 27 of a bearing 26 is then pushed inside the cage 22 to provide internal support for the roller elements 25 whereupon suction can be discontinued. The outer race 30 of the bearing 26 can then be fitted over the cage.

In a modified form of this embodiment, the spaces between the elements 28 are made narrower than the diameter of the roller elements 25 so as to enable the insertion of roller elements into cages having windows which are not restricted radially outwardly to provide external support for the roller elements. In this case, such a cage, after insertion of the roller elements, would have to be withdrawn directly into the outer race 30 of the bearing 26 either simultaneously with, or after, the insertion of the inner race 27 into the cage.

Figure 7:
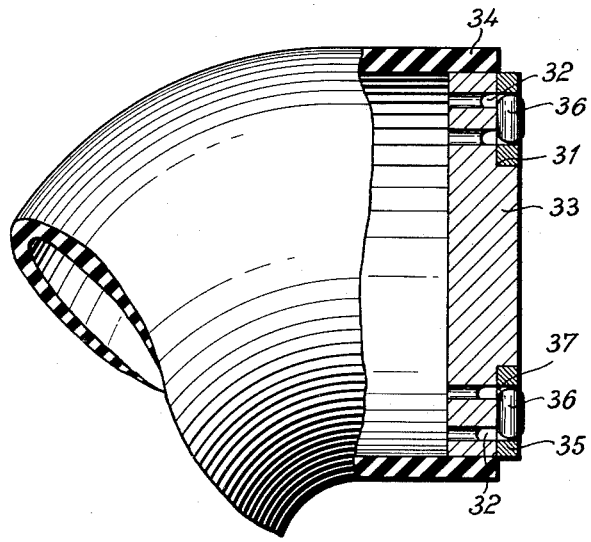
FIGURE 7 illustrates diagrammatically a fifth embodiment of the invention.
Figure 8:
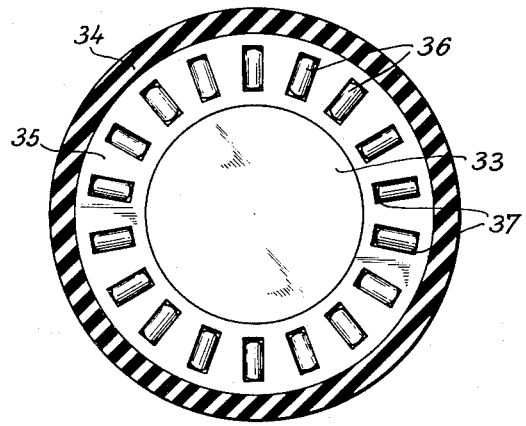
FIGURE 8 is an end view of FIGURE 7.

FIGURES 7 and 8 illustrate a device for inserting needles 36 into a disc-like cage 35 in which the windows 37 are arranged radially. The device comprises a circular nozzle fitted into the mouth of a hose 34. The nozzle is formed with a centering projection 33 providing an annular shoulder 31 against which the cage 35 bears. The nozzle is also formed with apertures 32 arranged to register with the windows 37 and shaped to prevent the needles 36 passing therethrough during operation of the device, as the windows of the cage in the illustrated embodiment are not shaped to provide axial support to the inside (as viewed) of the cage. During operation, a fan (not shown) aspirates air through the windows 37 and the apertures 32 into the hose 34 to suck a needle from a container of needles (not shown) into each window 37 whereupon a race is first applied to the outside of the cage and, after stopping aspiration of air, another race is applied to the inside of the cage after removal from the nozzle, the first race being positioned during removal below the cage to prevent the needles from falling out of their respective windows.

The suction device illustrated in FIGURES 7 and 8 can also be used as an assembling means for cages comprising two discs laid one on top of the other, of known construction. In this case the suction device constitutes part of a tool. This device can also readily be modified for inserting roller elements in conical cages and races.

Figure 9:
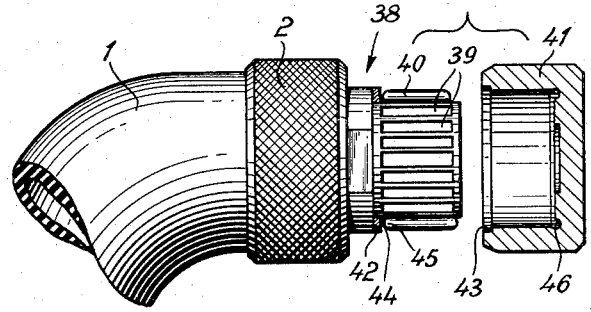
FIGURE 9 illustrates diagrammatically a sixth embodiment of the invention.

Needle rollers for universal joints of known construction are manufactured in very large numbers in series production. The introduction of bearing needles into these races can also be carried out in a particularly economical manner. FIGURE 9 illustrates a device suitable for charging needles into cageless bearings. The device comprises a suction nozzle 38 coupled to a hose and formed with a reduced diameter portion defining an annular shoulder against which a ring 42 is pushed. The reduced diameter portion is formed with slots 39 which communicate with a recess formed in the nozzle, which recess opens into the hose. The arrangement is such that, during operation, air is aspirated by a fan (not shown) through the slots 39 and the recess into the hose to suck a needle into each of the slots 39. The slots 39 are so arranged that the needles when sucked against the slots 39 form a closed ring around the reduced diameter portion of the nozzle, which portion has approximately the diameter of the bearing journal around which the needles are to be assembled. Since the needles cannot be immediately assembled on the bearing journal, means must be provided for preventing displacement of the needles when inserted into an outer race 41 which is shown closed at one end. These means comprise an annular groove 46 formed in the end wall of the race 41, a shoulder 43 at the mouth of the race for receiving the ring 42 when the race is slipped over the needles 40, and a small projection 44 extending axially from the inner periphery of the ring 42, which projection is arranged to engage one of the rounded ends 45 of the needles 40 on the inside. Thus, when the needles 40 have been sucked from a needle container against the slots 39 of the nozzle by air aspirated by a fan (not shown) through the slots and the internal recess of the nozzle into the hose, and the outer race 41 has been fitted over the needles 40, the needles are supported radially outwardly by the wall of the race and are supported radially inwardly by the projection 44 of the ring 42 and by the groove 46. The ring 42 and the groove 46 also serve to prevent axial movement of the needles in the race 41.

I claim:
1. In a method of assembling a bearing having a race and a plurality of roller elements, the steps of sucking air through a circular series of apertures formed in a locating body and spaced apart circumferentially in accordance with the required assembled location of the roller elements and each aperture having a shape corresponding substantially to the roller elements and a dimension at one side thereof permitting a roller element to enter therein and a lesser dimension at the other side to prevent escape of the roller elements in at least one direction, extracting by the suction of air through said apertures a plurality of roller elements from a random supply of such elements, drawing each one of said extracted roller elements by suction into a corresponding aperture of said locating body through one side of the aperture against the other side of the aperture, and maintaining the suction of air to hold the extracted roller elements in position in said apertures during engagement of said roller elements with a race in the assembly of the bearing to prevent escape of the roller elements through said one side of the apertures.

2. A method of assembling a bearing having a race, a plurality of roller elements and a cage formed with apertures for holding said elements in circumferentially spaced apart relation and each aperture having a shape corresponding substantially to the roller elements and a dimension at one side thereof permitting a roller element to enter therein and a lesser dimension at the other side to prevent escape of the roller elements in at least one direction, said method comprising the steps of drawing air by suction through the apertures of said cage, placing the cage in a random supply of roller elements and drawing, by suction, a roller element into each of said apertures through said one side of the aperture against the other side of the aperture, maintaining the suction to hold said roller elements in position in the apertures of the cage, and assembling said cage and the roller elements carried thereby with the associated race to prevent escape of the roller elements through said one side of the apertures.

3. A device for assembling a bearing having a race and a plurality of roller elements, said device comprising a body of circular cross-section for locating, during assembly of the bearing, said roller elements in the required position, said body having formed therein a circular series of apertures spaced apart circumferentially in accordance with the required positioning of said roller elements and each aperture having a shape corresponding substantially to the roller elements and a dimension at one side thereof permitting a roller element to enter therein and a lesser dimension at the other side to prevent escape of the roller elements in at least one direction, and suction means for extracting from a random supply of roller elements a plurality of said elements and for drawing each one of such extracted roller elements through said one side of the aperture into a corresponding aperture against the other side of the aperture to hold said elements in position by suction during assembly of the bearing.

4. A device for assembling a bearing having a race and a plurality of roller elements, said device comprising a cylindrical hollow body formed in the wall thereof with a plurality of apertures spaced circumferentially in accordance with the required spacing of the roller elements when assembled in the bearing and each aperture having a shape corresponding substantially to the roller elements and a dimension at one side thereof permitting a roller element to enter therein and a lesser dimension at the other side to prevent escape of the roller elements in at least one direction, means for drawing suction air through said body to draw from a random supply of roller elements, one of such elements through the said one side of each aperture into each of said apertures and against the said other side thereof for holding the roller elements in the apertures during the assembly thereof with said race.

5. A device as claimed in claim 4, wherein the cylindrical body comprises a tubular nozzle closed at one end and connected at the opposite end to said suction means, said tubular nozzle being engageable in an outer cylindrical race of the bearing for positioning in said race a plurality of roller elements held by suction in the apertures formed in said tubular nozzle.

6. A device as claimed in claim 5, wherein the cylindrical wall of said nozzle has an outside diameter dimensioned according to the interior diameter of a bearing cage to be fitted over said nozzle, the apertures formed in the wall of said nozzle being spaced circumferentially for registration with corresponding apertures in the bearing cage.

7. A device for assembling a bearing having a cylindrical race and a plurality of roller elements, said device comprising a cylindrical hollow body formed in the wall thereof with a plurality of apertures spaced circumferentially in accordance with the required spacing of the roller elements when assembled in the bearing and each aperture having a shape corresponding substantially to the roller elements and a dimension at one side thereof permitting a roller element to enter therein and a lesser dimension at the other side to prevent escape of the roller elements in at least one direction, a closure disc removably fitted into one end of said body, an attachment sleeve engaged removably in the opposite end of said body, and suction means including a suction pipe secured removably by said attachment sleeve to said body for drawing air by suction through the apertures in said body to draw from a random supply of roller elements, one of such elements through said one side of the aperture into each of said apertures against the other side of the aperture and for holding the roller elements by suction in said apertures during assembly of said body and said elements within the cylindrical race.

8. A device for assembling a bearing having a cylindrical race and a plurality of roller elements disposed in an apertured cage about said inner race, said device comprising a suction pipe, a suction nozzle fitted co-axially into an open end of said pipe, said nozzle including a hollow cylindrical member embraced by said pipe and formed at its axially outer end with a mouth for insertion of said cage axially into the interior of said member, a closure plug fitted into the axially inner end of said member, and a plurality of axial slots formed in the cylindrical wall of said member and opening at the axially inner end thereof into the suction pipe, said slots defining passages for suction air to draw roller elements from a random supply through the mouth of said nozzle member and to hold said roller elements in the apertures of said cage for insertion of the inner bearing race, each of said apertures having at one side thereof a shape and dimension to prevent the roller elements from escaping in at least one direction.

9. A device for the assembly of a bearing having a windowed cage and a plurality of roller elements, said device comprising a suction pipe, a nozzle fitted axially into the free end of said pipe, said nozzle comprising a cylindrical member formed at its axially outer end with a peripheral recess for the reception of the bearing cage, and formed also with a circular series of axial holes spaced circumferentially to register with the windows in said cage, said axial holes opening at the axially inner end of said nozzle member into the interior of said pipe and defining passages for suction air for drawing a roller element from a random supply of such elements, into each of the windows of said cage, each window being at its radially inner end of a size and shape to accommodate a roller element but prevent its escape from the window radially inwardly.

(References on following page)

References Cited in the file of this patent

UNITED STATES PATENTS

| | | |
|---|---|---|
| 1,517,574 | Morrison | Dec. 2, 1924 |
| 1,627,965 | Gamble | May 10, 1927 |
| 1,758,653 | Cramer | May 13, 1930 |
| 1,783,791 | Hughes | Dec. 2, 1930 |
| 1,840,638 | Scribner | Jan. 12, 1932 |
| 1,947,004 | Goddard | Feb. 13, 1934 |
| 2,366,935 | Schmid | Jan. 9, 1945 |
| 2,753,181 | Anander | July 3, 1956 |
| 2,855,653 | Kastenbein | Oct. 14, 1958 |